United States Patent
Paradise

(10) Patent No.: US 8,776,529 B2
(45) Date of Patent: Jul. 15, 2014

(54) CRITICAL FLOW NOZZLE FOR CONTROLLING FUEL DISTRIBUTION AND BURNER STABILITY

(75) Inventor: Bruce Paradise, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 961 days.

(21) Appl. No.: 12/891,358

(22) Filed: Sep. 27, 2010

(65) Prior Publication Data

US 2012/0073301 A1  Mar. 29, 2012

(51) Int. Cl.
F02C 1/00 (2006.01)

(52) U.S. Cl.
USPC ............................................. 60/772; 60/724

(58) Field of Classification Search
USPC ............... 60/39.281, 734, 739, 243, 740, 741
See application file for complete search history.

(56) References Cited

U.S. PATENT DOCUMENTS

| | | | | |
|---|---|---|---|---|
| 2,712,218 A | * | 7/1955 | Ritter ........................ | 60/39.094 |
| 2,795,106 A | * | 6/1957 | Onslow ...................... | 60/39.37 |
| 2,804,241 A | * | 8/1957 | Gaubatz et al. ............ | 222/335 |
| 3,043,107 A | * | 7/1962 | Magaus, Jr. .............. | 417/79 |
| 3,129,563 A | | 4/1964 | Long | |
| 3,327,757 A | * | 6/1967 | Alberani et al. ........... | 60/39.281 |
| 3,486,458 A | * | 12/1969 | Tyler ............................... | 415/28 |
| 3,564,844 A | | 2/1971 | Rimmer | |
| 3,922,113 A | * | 11/1975 | Turner ......................... | 417/79 |
| 4,027,473 A | * | 6/1977 | Baker ........................ | 60/39.281 |
| 5,003,771 A | | 4/1991 | Kester et al. | |
| 5,412,949 A | * | 5/1995 | Joland ........................... | 60/739 |
| 5,809,771 A | * | 9/1998 | Wernberg .................. | 60/39.094 |
| 5,884,483 A | | 3/1999 | Munro | |
| 5,896,737 A | | 4/1999 | Dyer | |
| 6,321,527 B1 | | 11/2001 | Dyer et al. | |
| 6,786,049 B2 | | 9/2004 | Parsons et al. | |
| 6,813,876 B2 | * | 11/2004 | Griffiths et al. ............. | 60/39.281 |
| 7,251,925 B2 | | 8/2007 | Paradise | |
| 7,540,141 B2 | * | 6/2009 | Goldberg et al. .......... | 60/39.281 |
| 2003/0200754 A1 | * | 10/2003 | Futa et al. ........................ | 60/776 |
| 2007/0251952 A1 | | 11/2007 | Paradise | |
| 2010/0037612 A1 | | 2/2010 | Futa et al. | |

* cited by examiner

Primary Examiner — Phutthiwat Wongwian
(74) Attorney, Agent, or Firm — Kinney & Lange, P.A

(57) ABSTRACT

A fuel delivery system for delivering fuel to a gas turbine engine includes a fixed critical flow nozzle, a first fuel nozzle and a second fuel nozzle. The fixed critical flow nozzle and the variable critical flow nozzle are connected to a fuel source in parallel. The fixed critical flow nozzle has an orifice throat with a fixed effective cross-sectional area. The variable critical flow nozzle has an orifice throat with a variable effective cross-sectional area. The first fuel nozzle is connected to the fixed critical flow nozzle for delivering fuel to the gas turbine engine, and the second fuel nozzle is connected to the variable critical flow nozzle for delivering fuel to the gas turbine engine.

19 Claims, 3 Drawing Sheets

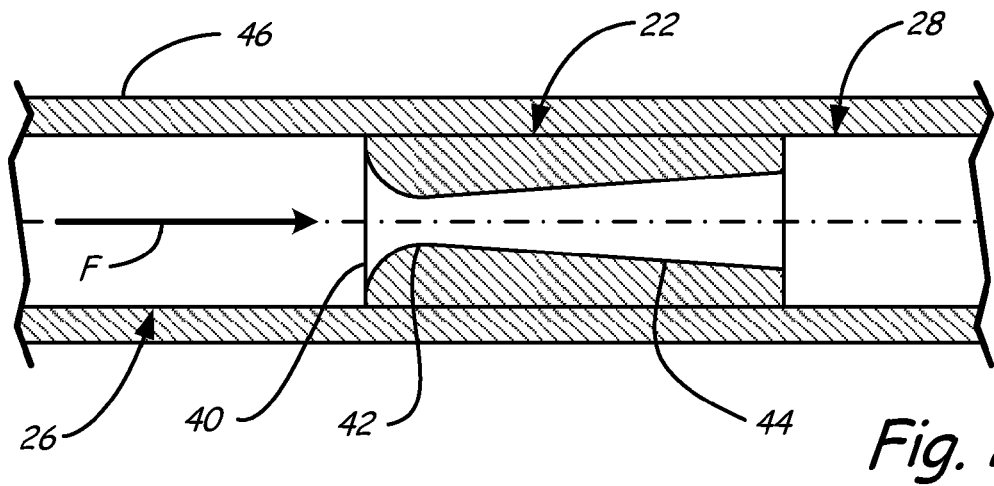
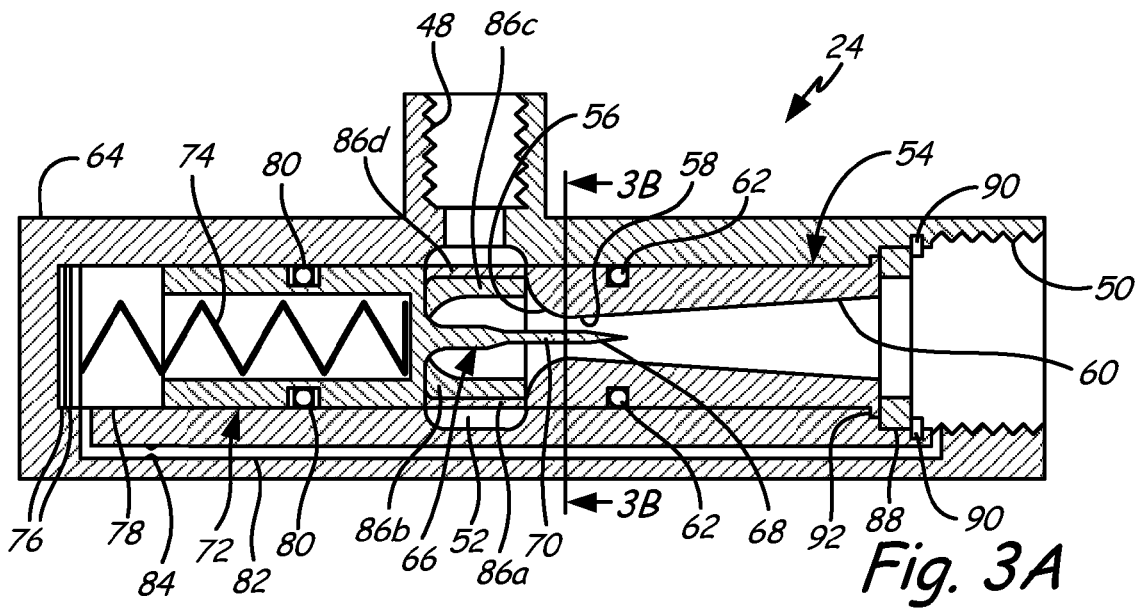
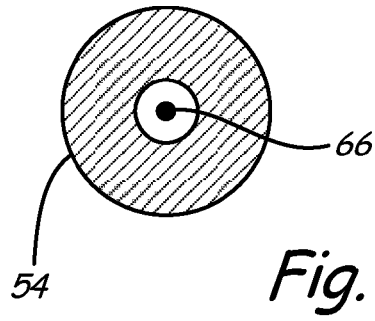

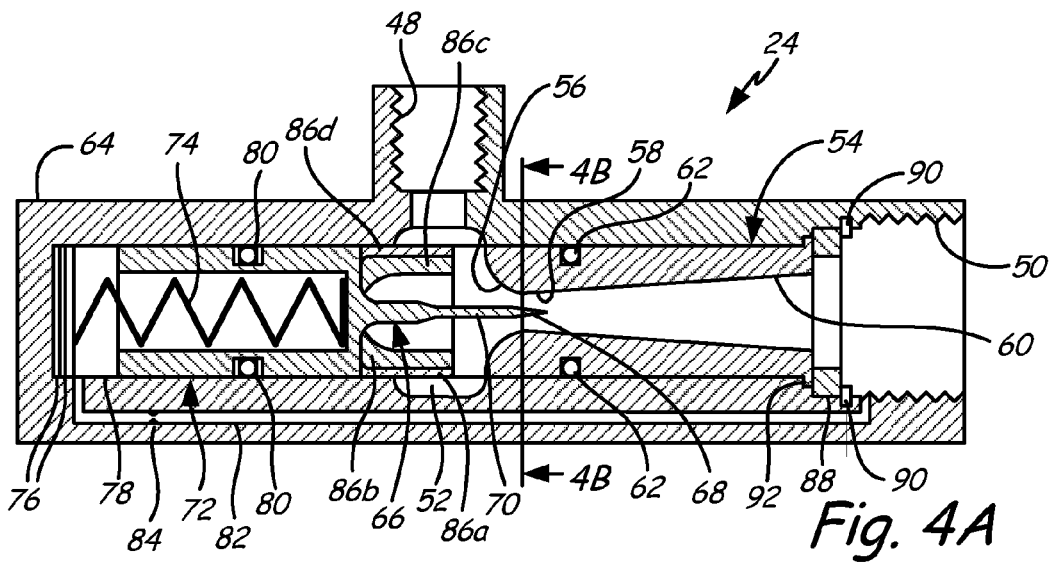
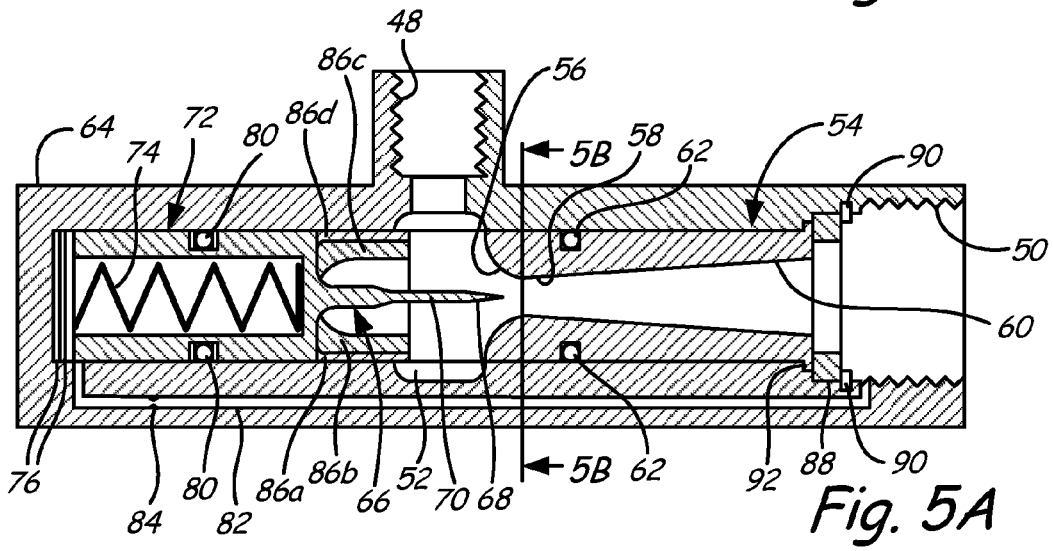
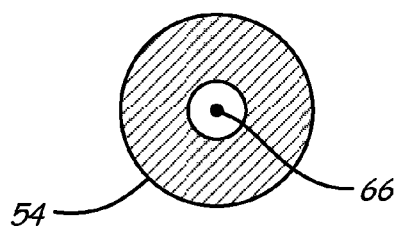
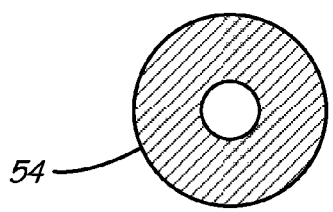

CRITICAL FLOW NOZZLE FOR CONTROLLING FUEL DISTRIBUTION AND BURNER STABILITY

BACKGROUND

Fuel delivery systems for gas turbine engines typically contain many complex components. For example, a fuel delivery system can include a flowmeter that provides fuel to a shut off valve, which controls delivery of fuel to flow divider circuitry. The flow divider circuitry adjusts the distribution of fuel to the fuel nozzles while the total fuel flow is measured by the flowmeter. Gas turbine engines on aircrafts are generally operated under two conditions: low flow and high flow. Low flow conditions include for example ground idle and descent, and high flow operations include take off and cruise.

The flow divider valve enables unequal fuel flow to the fuel nozzles during specific conditions and equal fuel flow during other conditions. For example, equal flow may be provided to the fuel nozzles during high flow operations and unequal flow may be provided during low flow operations. The unequal flow to fuel nozzles of the combustor provides for some quadrants of the combustor to be at a higher pressure than other quadrants. This creates a fixed standing pressure wave in the combustor plenum and prevents a rotating pressure wave from occurring. A rotating wave is undesirable because it creates an intense acoustic tone known as howling.

Current fuel delivery systems are expensive and heavy. Additionally, the current fuel flow delivery systems are complex and typically require complex control systems.

SUMMARY

A fuel delivery system for delivering fuel to a gas turbine engine includes a fixed critical flow nozzle, a variable critical flow nozzle, a first fuel nozzle and a second fuel nozzle. The fixed critical flow nozzle and the variable critical flow nozzle are connected to a fuel source in parallel. The fixed critical flow nozzle has an orifice throat with a fixed effective cross-sectional area. The variable critical flow nozzle has an orifice throat with a variable effective cross-sectional area. The first fuel nozzle is connected to the fixed critical flow nozzle for delivering fuel to the gas turbine engine, and the second fuel nozzle is connected to the variable critical flow nozzle for delivering fuel to the gas turbine engine. A method of fuel delivery is also provided.

BRIEF DESCRIPTION OF THE DRAWINGS

FIG. 2 is an enlarged cross-sectional view of one fixed critical flow nozzle of FIG. 1.

FIGS. 3a and 3b are enlarged cross-sectional views of one variable critical flow nozzle of FIG. 1 at a default position during low fuel flow.

FIGS. 4a and 4b are enlarged cross-sectional views of one variable critical flow nozzle of FIG. 1 at a transitional position.

FIGS. 5a and 5b are enlarged cross-sectional views of one variable critical flow nozzle of FIG. 1 at a fully actuated position during high fuel flow.

DETAILED DESCRIPTION

Figure 1:
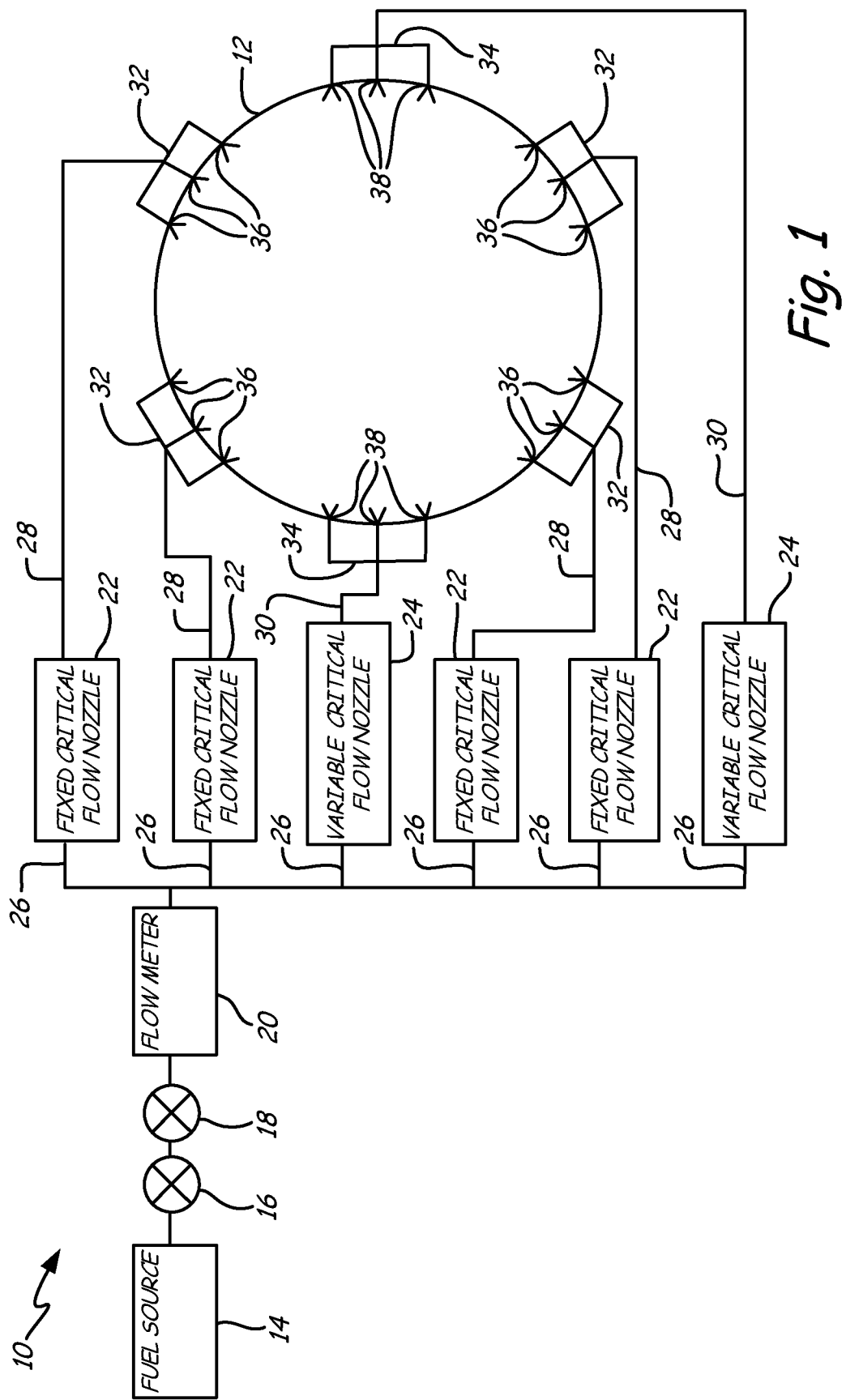
FIG. 1 is a schematic of a fuel distribution system having fixed critical flow nozzles and variable critical flow nozzles.

Fuel delivery system 10 for delivering fuel to combustor 12 of a gas turbine engine is illustrated schematically in FIG. 1.

Fuel delivery system 10 includes fuel source 14, metering valve 16, shut-off valve (SOV) 18, flowmeter 20, fixed critical flow nozzles 22, variable critical flow nozzles 24, inlet lines 26, first outlet lines 28, second outlet lines 30, first manifolds 32, second manifolds 34, first fuel nozzles 36 and second fuel nozzles 38. Metering valve 16 couples to SOV 18, which couples to flowmeter 20. Flowmeter 20 directly couples to fixed critical flow nozzles 22 and variable critical flow nozzles 24 by inlet lines 26. First outlet lines 28 connect fixed critical flow nozzles 22 to first manifolds 32, which connect to first fuel nozzles 36. Similarly, second outlet lines 30 connect variable critical flow nozzles 24 to second manifolds 34, which supply fuel to second fuel nozzles 38. As illustrated in FIG. 1, first and second manifolds 32 and 34 are identical, and first fuel nozzles 36 and second fuel nozzles 38 are identical. However, this is not required. First outlet lines 28 and second outlet lines 30 are typically unique line lengths to support connecting the plumbing about combustor 12 as required.

Fuel metering valve 16 regulates fuel flow to combustor 12, and SOV 18 provides leak tight shut-off downstream of fuel metering valve 16. Flow metering valve 16 provides low fuel flow during, for example, ground idle and descent, and high fuel flow during, for example, take off and cruise. Flowmeter 20 is positioned downstream of SOV 18 so that an inlet of flowmeter 20 is connected to an outlet of SOV 18. Flow meter 20 measures the fuel flow to combustor 12. Measurements from flowmeter 20 are typically used to compare total fuel burn flow rate to the aircraft wing tank level gauges.

Pressurized fuel from flowmeter 20 is delivered to fixed critical flow nozzles 22 and variable critical flow nozzles 24 by inlet lines 26. Fixed critical flow nozzles 22 and variable critical flow nozzles 24 are arranged in parallel, and fuel delivered to each fixed critical flow nozzle 22 and variable critical flow nozzle 24 is at the same inlet pressure. Fixed critical flow nozzles 22 and variable critical flow nozzles 24 act as flow dividers. Fixed critical flow nozzles 22 deliver fuel through first outlet lines 28 to first manifolds 32. Each first manifold 32 includes multiple first fuel nozzles 36 which spray fuel into combustor 12 in a desired manner. Similarly, variable critical flow nozzles 24 deliver fuel through second outlet lines 30 to second manifolds 34. Each second manifold 34 includes multiple second fuel nozzles 38 which spray fuel into combustor 12 in a desired manner.

First and second fuel nozzles 36 and 38 are not always provided with equal flow. For example at high flow conditions, such as during take-off and cruise, fixed critical flow nozzles 22 and variable critical flow nozzles 24 provide first and second fuel nozzles 36 and 38 with equal flow, and at low flow conditions, such as ground idle and descent, fixed critical flow nozzles 22 and variable critical flow nozzles 24 provide first and second fuel nozzles 36 and 38 with unequal flow. Fixed critical flow nozzles 22 and variable critical flow nozzles 24 allow automatic fuel flow equalization at high flows and automatic asymmetric or unequal flow at low flows to combustor 12 as described further below Providing equal flow to first and second fuel nozzles 36 and 38 during high flow ensures that the fuel flow into the engine quadrants of combustor 12 is equal, of uniform temperature and below the temperature limit. Sustained unequal flow to combustor 12 can cause streaking and hot spots within combustor 12 that can significantly reduce the life of the engine of which combustor 12 is a part.

It can be desirable to have unequal or asymmetrical flow at low fuel flows. The unequal flow provides for some quadrants of combustor 12 to be at a higher pressure than other quadrants allowing a fixed standing pressure wave to be present in combustor 12. This condition can prevent a blow out of the engine during low fuel flow conditions and can reduce howling. At low fuel flows in fuel delivery system 10, second fuel nozzles 38 provide combustor 12 with a lower fuel flow than first fuel nozzles 36. In one example, second fuel nozzles 38 are located at the three- and nine-o'clock positions in combustor 12 and four first fuel nozzles 36 are equally spaced between second fuel nozzles 38. However, the number and position of first and second fuel nozzles 36 and 38 can be varied. In fuel delivery system 10, fixed critical flow nozzles 22 and variable critical flow nozzles 24 are provided with fuel at equal pressure, and fixed critical flow nozzles 22 and variable critical flow nozzles 24 control the fuel flow to combustor 12 to achieve equal or unequal fuel flow depending on the operating conditions.

FIG. 2 illustrates an enlarged cross-sectional view of fixed critical flow nozzle 22. Arrow F indicates the flow of fuel through fixed critical flow nozzle 22. Fuel enters fixed critical flow nozzle 22 at inlet cone 40, flows through orifice throat 42 and exits through recovery section 44. Fixed critical flow nozzle 22 can be positioned within housing 46 and attaches to inlet line 26 and first outlet line 28.

Fixed critical flow nozzle 22 is a nozzle having a converging-diverging shape. Fixed critical flow nozzle 22 converges to a minimum cross-sectional area at orifice throat 42 and then diverges along recovery section 44. The converging section of fixed critical flow nozzle 22 reduces the pressure of the fuel to its vapor pressure point. The diverging shape of recovery section 44 allows pressure recovery. In one example, recovery section 44 has about a 2.5 degree taper, which allows for good pressure recovery resulting in a minimum permanent loss across fixed critical flow nozzle 22. The effective cross-sectional area of orifice throat 42 is fixed. That is, the cross-sectional area available for fuel flow through orifice throat 42 is not adjustable in fixed critical flow nozzle 22. In one example, fixed critical flow nozzle has an outside diameter of about 1.0 centimeters (0.4 inches), is about 3.3 centimeters (1.3 inches) long and has a throat diameter of about 0.2 centimeters (0.08 inches).

Fixed critical flow nozzle 22 operates at a limiting condition known as critical or choked flow. Choked flow occurs when the Venturi effect acting on the fuel flowing through fixed critical flow nozzle 22 decreases the liquid pressure of the fuel to that of the liquid vapor pressure at the prevailing temperature. Orifice throat 42 is sized so that the differential pressure generated from inlet cone 40 to orifice throat 42 reduces the fuel to its vapor pressure point. Pressures lower than the vapor pressure cannot be reached because the volumetric expansion required is prevented by the fixed walls of fixed critical flow nozzle 22.

Fixed critical flow nozzle 22 operates at choked flow during high and low flow operations. Choked flow provides a fixed mass flow rate for a specified fluid at a given upstream pressure and temperature. The mass flow rate at choked flow is unaffected by fluctuations, surges or changes in the downstream pressure. The mass flow rate through fixed critical flow nozzle 22 is adjusted by adjusting the upstream pressure of the fuel (i.e., the pressure at inlet cone 40). Increasing the upstream pressure of the fuel results in an increased mass flow rate at choked flow. For example, at low flow requirements, fuel at low pressure is supplied to fixed critical flow nozzle 22. As the engine power and fuel flow request increases, the pressure of the fuel is increased in order to increase the flow rate through fixed critical flow nozzle 22 at choked flow.

Orifice throat 42 of fixed critical flow nozzle 22 has a fixed effective cross-sectional area. In contrast, the orifice throat of variable critical flow nozzle 24 has a variable effective cross-sectional area. FIG. 3A illustrates an enlarged cross-sectional view of variable critical flow nozzle 24 at a default position such as at start or low fuel flow. FIG. 3B illustrates a cross-sectional view of variable critical flow nozzle 24 taken along line 3B-3B of FIG. 3A. FIGS. 3A and 3B will be discussed together.

Variable critical flow nozzle 24 is supply pressure actuated and includes inlet 48, outlet 50, flow annulus 52, nozzle 54 (having inlet cone 56, orifice throat 58 and recovery section 60), nozzle seal 62, housing 64, needle 66 (having tapered portion 68 and straight portion 70), piston 72 (having spring 74, shims 76 and back chamber 78), sliding piston seal 80, sense or vent line 82 (having damping orifice 84), fingers 86a, 86b, 86c and 86d, spacer 88 and snap ring 90. In use, pressurized fuel enters through inlet 48, flows through flow annulus 52 and nozzle 54, and exits at outlet 50. Nozzle 54 regulates the mass flow rate of fuel using the Venturi principle. Needle 66 extends from piston 72 into nozzle 54. Piston 72 actuates to reposition needle 66 and change the effective cross-sectional area of orifice throat 58 of nozzle 54.

Nozzle 54, needle 66 and piston 72 are enclosed by housing 64. Sliding piston seal 80 can be used to form a seal between housing 64 and piston 72 and prevent or reduce leaking between piston 72 and housing 64 as piston 72 actuates. Similarly, nozzle seal 62 can form a seal between nozzle 54 and housing 64 to prevent or reduce leaking between housing 64 and nozzle 54.

Nozzle 54 is similar to the nozzle of fixed critical flow nozzle 22 of FIG. 2, and includes inlet cone 56, orifice throat 58 and recovery section 60. Nozzle 54 operates under the Venturi principle. The converging shape of nozzle 54 from inlet cone 56 to orifice throat 58 compresses the fuel to its vapor pressure point. Orifice throat 58 has the same diameter as orifice throat 42 of fixed critical flow nozzle 22 of FIG. 2. However, as shown in FIG. 3B, the effective cross-sectional area of orifice throat 58 is smaller than that of orifice throat 42 because of needle 66. The diverging downstream shape of nozzle 54 from orifice throat 58 to recovery section 60 enables sufficient pressure recovery. In one example, orifice throat 58 has a diameter of about 0.2 centimeters, recovery section 60 has about a 2.5 degree taper and housing 64 is about 1.3 centimeters in diameter (0.5 inches) and about 8.4 centimeters long (3.3 inches).

As shown in FIG. 3A, needle 66 extends from piston 72 into orifice throat 58. Needle 66 includes tapered portion 68 and straight portion 70. Straight portion 70 is located between piston 72 and tapered portion 68. By occupying the center of orifice throat 58, needle 66 reduces the effective cross-sectional area of orifice throat 58. That is, needle 66 reduces the cross-sectional area available for fluid flow. In FIGS. 3A and 3B, straight portion 70 of needle 66 is positioned in orifice throat 58, such that orifice throat 58 of variable critical flow nozzle 24 has a minimum effective cross-sectional area. Straight portion 70 has a constant diameter over a short range to produce a constant reduced effective cross-sectional area over a specified low fuel pressure range.

Piston 72 includes spring 74, shims 76 and back chamber 78. Spring 74 biases piston 72 to move needle 66 towards nozzle 54 along the horizontal axis. Shims 76 can be added or removed to change the initial compression of spring 74. Shims 76 enable piston 72 to be tuned without introducing holes into housing 64 which can be the site of leakage. Additionally, back chamber 78 contains low pressure fuel that biases piston 72 towards nozzle 54.

Sense line 82 is connected between back chamber 78 and outlet 50. Sense line 82 enables low pressure fuel from outlet 50 to enter or exit back chamber 78 when piston 72 actuates. The volume of fuel displaced during actuation is small and does not have a significant affect on the downstream burner operations. Damping orifice 84 may be used in sense line 82 to smooth the flow of fuel through sense line 82. Damping orifice 84 reduces bouncing of piston 72 due to pulsating hydraulic pressure.

Fingers 86a, 86b, 86c and 86d (collectively referred to as fingers 86) extend axially from piston 72 and approximately parallel to needle 66. The ends of fingers 86 opposite piston 72 abut nozzle 54 in the default position. Fingers 86 limit the axial movement of piston 72. Fingers 86 position needle 66 at a predetermined depth in nozzle 54 at low flow operation. Fingers 86 are arranged so fuel can flow into flow annulus 52 when piston 72 is at maximum extension and fingers 86 contact nozzle 54. Fingers 86 do not prevent fuel flow into flow annulus 52. Although four fingers 86 extend from piston 72 in FIG. 3A, more or less fingers 86 can be used.

Housing 64 surrounds piston 72, needle 66 and nozzle 54. Inlet 48 is connected to fuel inlet line and outlet 50 is connected to second outlet line 30 as described above with respect to FIG. 1. Although inlet 48 and outlet 50 are shown as threaded connections, inlet 48 and outlet 50 can use alternative connection methods.

Spacer 88 and snap ring 90 can be used at outlet 50. Spacer 88 holds nozzle 54 seated at a desired location and snap ring 90 keeps the assembly in position. Alternatively, spacer 88 and snap ring 90 may not be present.

Variable critical flow nozzle 24 is designed without fasteners, such as screws, in housing 64 in order to reduce leakage. Housing 64 is designed so that the components of variable critical flow nozzle 24 can be inserted through outlet 50 during assembly. Housing 64 can also include step 92. Step 92 prevents nozzle 54 from moving axially towards piston 72 (i.e., to the left), and step 92 and snap ring 90 maintain nozzle 54 from moving axially away from piston 72 (i.e., to the right).

Piston 72 changes the axial location of needle 66 in orifice throat 58 to change the effective cross-sectional area of orifice throat 58. Piston 72 automatically adjusts the axial position of needle 66 based on the supply pressure of the fuel at inlet 48. Piston 72 moves axially as a function of the fuel pressure of flow annulus 52, the fuel pressure of back chamber 78 and spring 74. In use, the pressurized fuel enters flow annulus 52 and pushes against piston 72. Piston 72 moves backwards or to the left along the axial axis when the force of the inlet fuel in flow annulus 52 is greater than the combined force from spring 74 and the low pressure fuel in back chamber 78. The low pressure fuel of back chamber 78 reduces the size of spring 74.

When piston 72 moves backwards, the orifice throat effective cross-sectional area of orifice throat 58 can increase because needle 66 is repositioned. Under the Venturi effect, increasing the effective cross-sectional area of orifice throat 58 increases the flow rate at the choke flow of nozzle 54.

FIGS. 3A and 3B illustrate variable critical flow nozzle 24 at low flow operation and having a minimum orifice throat effective cross-sectional area. Piston 72 is automatically supply pressure actuated and increases the effective cross-sectional area of orifice throat 58 at higher fuel flows (and corresponding higher pressures). FIGS. 4A and 4B illustrate variable critical flow nozzle 24 at a transition position between low and high flows, and FIGS. 5A and 5B illustrate variable critical flow nozzle 24 at high flow operation and having a maximum orifice throat effective cross-sectional area. FIGS. 4A and 4B illustrate variable critical flow nozzle 24 at a transitional stage (i.e., having fuel pressure between the high and low fuel pressures). During the transition stage, the fuel pressure is increasing from the low pressure of the low flow condition to the high pressure of the high fuel flow. Thus, the fuel in flow annulus 52 increasingly compresses spring 74 of piston 72 so that needle 66 is removed from nozzle 54 and fingers 86 do not abut nozzle 54. At the stage illustrated in FIGS. 4A and 4B, tapered portion 68 of needle 66 is positioned at orifice throat 58. Tapered portion 68 of needle 66 has a smaller diameter than straight portion 70. This results in variable critical flow nozzle 24 of FIGS. 4A and 4B having a greater effective cross-sectional area at orifice throat 58 than that of FIGS. 3A and 3B. Tapered portion 68 of needle 66 has a gentle taper which reduces or minimizes perturbations in fuel flow as needle 66 enters and exits nozzle 54.

The transition stage is transitory. The transition stage is not a typical operating mode and is generally only experienced when transitioning between high and low flow operations. Variable critical flow nozzle 24 can be designed so that the effective cross-sectional area of orifice throat 58 is at a minimum during low flow operations, is at a maximum during high flow operations and transitions at a non-critical zone. For example, variable critical flow nozzle 24 may transition at a pressure above that of ground idle and below that of cruise. Although the transition stage is described above when moving from low to high flow conditions, one skilled in the art will recognize that the reverse process occurs when moving from high to low flow conditions.

The fuel pressure of the fuel distribution system will continue to increase from that of the transition stage to a defined high pressure range. FIGS. 5A and 5B illustrate variable critical flow nozzle 24 at this range. As shown, at high flow and corresponding high pressure, needle 66 is fully removed from orifice throat 58. The effective cross-sectional area of orifice throat 58 is at a maximum in FIGS. 5A and 5B. Because variable critical flow nozzle 24 of FIGS. 5A and 5B has a larger effective orifice throat cross-sectional area, this variable critical flow nozzle 24 has a higher flow rate at choked flow compared to those of FIGS. 3A, 3B, 4A and 4B. As described above, nozzle 54 of variable critical flow nozzle 24 has the same diameter orifice throat as that of fixed critical flow nozzle 22 of FIG. 2. Therefore, with needle 66 no longer occupying a portion of orifice throat 58, the effective cross-sectional area of orifice throat 58 of variable critical flow nozzle 24 and the effective cross-sectional area of orifice throat 42 of fixed critical flow nozzle 22 of FIG. 2 are equal.

As shown in FIG. 5A, when piston 72 is actuated so that orifice throat 58 is at a maximum effective cross-sectional area, fuel volume is reduced in back chamber 78. As piston 72 actuates towards nozzle 54, lower pressure fuel will enter back chamber 78.

In summary, fuel delivery system 10 of FIG. 1 includes fixed critical flow nozzles 22 and variable critical flow nozzles 24. Fixed critical flow nozzles 22 and variable critical flow nozzles 24 operate at choked flow so that desired flow rates are produced at high and low flow operations. Fixed critical flow nozzles 22 and variable critical flow nozzles 24 divide the fuel flow between several first manifolds 32 and second manifolds 34, which provide the fuel to combustor 12. The use of fixed critical flow nozzles 22 and variable critical flow nozzles 24 enable equal flow to combustor 12 under certain operating conditions and unequal flow under other operating conditions.

Previously, flow divider valves were used to divide the flow of fuel between the manifolds. Tighter tolerances are achievable in manufacturing fixed critical flow nozzles 22 and variable critical flow nozzles 24 compared to the manufacturing of flow divider valves. These tighter tolerances result in splitting the fuel flow with increased precision when fixed critical flow nozzles 22 and variable critical flow nozzles 24 are used.

Variable critical flow nozzles 24 are supply pressure actuated and automatically cause an imbalance of flow going to first and second fuel nozzles 36 and 38 at low pressure. At high pressures, variable critical flow nozzles 24 automatically adjust the effective cross-sectional area of orifice throat 58 so that the effective cross-sectional areas of orifice throats 42 and 58 are equal. This results in providing first and second fuel nozzles 36 and 38 with equal flow. At low flow, variable critical flow nozzles 24 automatically adjust the effective cross-sectional area of orifice throat 58 so that the effective cross-sectional area is less than that of fixed critical flow nozzles 22. This results in variable critical flow nozzles 24 providing a lower fuel flow rate to second manifold 34 compared to that provided by fixed critical flow nozzles 22 to first manifolds 32. The unequal or asymmetric flow provides for some quadrants of combustor 12 to be at a higher pressure than others and can reduce howling.

Variable critical flow nozzle 24 seamlessly switches between equal and unequal flow at high and low flow respectively. Variable critical flow nozzle 24 automatically actuates based on the inlet pressure. Variable critical flow nozzle 24 is not electronically controlled and additional control logic is not necessary.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel delivery system for delivering fuel to a gas turbine engine, the fuel delivery system comprising:
 a fixed critical flow nozzle connected to a fuel source, the fixed critical flow nozzle having an orifice throat with a fixed effective cross-sectional area;
 a variable critical flow nozzle connected to the fuel source and in parallel with the fixed critical flow nozzle, the variable critical flow nozzle having an orifice throat with a variable effective cross-sectional area, the variable critical flow nozzle further having:
  an inlet;
  a nozzle having a converging-diverging shape and including the orifice throat and a recovery section downstream of the orifice throat; and
  a needle mounted on a spring biased piston, the needle positionable in the orifice throat to adjust the effective cross-sectional area of the orifice throat based upon a fuel pressure at the inlet;
 a first fuel nozzle connected to the fixed critical flow nozzle for delivering fuel to the gas turbine engine; and
 a second fuel nozzle connected to the variable critical flow nozzle for delivering fuel to the gas turbine engine.

2. The fuel delivery system of claim 1, wherein the orifice throat of the variable critical flow nozzle has a maximum effective cross-sectional area equal to the effective cross-sectional area of the orifice throat of the fixed critical flow nozzle.

3. The fuel delivery system of claim 1, wherein the needle comprises:
 a constant diameter portion attached to the spring biased piston; and
 a tapered tip portion extending from the constant diameter portion, wherein the diameter of the tapered tip portion decreases with increasing distance from the spring biased piston.

4. The fuel distribution system of claim 1, wherein the variable critical flow nozzle further comprises a vent line connected to a back chamber of the spring biased piston opposite the needle and connected downstream of the recovery section.

5. The fuel distribution system of claim 4, wherein the vent line comprises a damping orifice.

6. The fuel distribution system of claim 1, and further comprising:
 a flowmeter directly coupled to the fixed critical flow nozzle and the variable critical flow nozzle through inlet lines.

7. The fuel distribution system of claim 6, and further comprising:
 a shut off valve having an inlet and an outlet, the outlet of the shut off valve coupled to an inlet of the flowmeter.

8. The fuel distribution system of claim 1, wherein the orifice throat of the variable critical flow nozzle is calibrated to have a minimum effective cross-sectional area at low fuel flow and to have a maximum effective cross-sectional area at a high fuel flow.

9. The fuel distribution system of claim 1 and further comprising:
 a second fixed critical flow nozzle connected in parallel with the fixed critical flow nozzle and the variable critical flow nozzle.

10. The fuel distribution system of claim 1, wherein there is a greater number of fixed critical flow nozzles than variable critical flow nozzles.

11. A method for fuel distribution in a gas turbine engine, the method comprising:
 flowing fuel to a variable critical flow nozzle and a fixed critical flow nozzle arranged in parallel;
 flowing fuel from the fixed critical flow nozzle to a first fuel nozzle of the gas turbine engine, the fixed critical flow nozzle having an orifice throat with a fixed effective cross-sectional area;
 flowing fuel from the variable critical flow nozzle to a second fuel nozzle of the gas turbine engine, the variable critical flow nozzle having an orifice throat with an adjustable effective cross-sectional area; and
 gradually reducing the effective cross-sectional area of the orifice throat of the variable critical flow nozzle to a specified minimum effective cross-sectional area during low fuel flow so that fuel flow to the first fuel nozzle and the second fuel nozzle are unequal by positioning a needle with a tapered tip in the orifice throat.

12. The method of claim 11 and further comprising:
 increasing the effective cross-sectional area of the orifice throat of the variable critical flow nozzle to a specified maximum effective cross-sectional area during high fuel flow so that the fuel flow to the first fuel nozzle and the second fuel nozzle are equal.

13. The method of claim 12, wherein increasing the effective cross-sectional area of the orifice throat of the variable critical flow nozzle comprises:
 increasing fuel flow to increase pressure against a spring biased piston attached to the needle and increase the distance between the tip of the needle and a nozzle which the tip of the needle is positioned within at a low pressure.

14. The method of claim 13, and further comprising:
reducing a first fuel from a backside of a piston chamber of the spring biased piston, wherein the backside of the piston chamber is opposite the needle; and
directing the first fuel to a position downstream of the nozzle.

15. The method of claim 14, and further comprising:
passing the first fuel through a damping orifice before reaching the position downstream of the nozzle.

16. The method of claim 11, wherein directing fuel to the variable critical flow nozzle and the fixed critical flow nozzle comprises directing fuel to a greater number of fixed critical flow nozzles than variable critical flow nozzles.

17. The method of claim 11, wherein at low flow, the orifice throat of the variable critical flow nozzle has a smaller effective cross-sectional area than that of the fixed critical flow nozzle, and wherein at high flow, the orifice throat of the variable critical flow nozzle has the same effective cross-sectional area as that of the fixed critical flow nozzle.

18. A method for fuel distribution in a gas turbine engine, the method comprising:
flowing fuel to a variable critical flow nozzle and a fixed critical flow nozzle arranged in parallel;
flowing fuel from the fixed critical flow nozzle to a first fuel nozzle of the gas turbine engine, the fixed critical flow nozzle having an orifice throat with a fixed effective cross-sectional area;
flowing fuel from the variable critical flow nozzle to a second fuel nozzle of the gas turbine engine, the variable critical flow nozzle having an orifice throat with an adjustable effective cross-sectional area;
reducing the effective cross-sectional area of the orifice throat of the variable critical flow nozzle to a specified minimum effective cross-sectional area during low fuel flow so that fuel flow to the first fuel nozzle and the second fuel nozzle are unequal; and
increasing the effective cross-sectional area of the orifice throat of the variable critical flow nozzle to a specified maximum effective cross-sectional area during high fuel flow so that the fuel flow to the first fuel nozzle and the second fuel nozzle are equal, wherein increasing the effective cross-sectional area of the orifice throat of the variable critical flow nozzle includes increasing fuel flow to increase pressure against a spring biased piston attached to a needle and increase the distance between a tip of the needle and a nozzle which the tip of the needle is positioned within at a low pressure.

19. The method of claim 18, and further comprising:
reducing a first fuel from a backside of a piston chamber of the spring biased piston, wherein the backside of the piston chamber is opposite the needle; and
directing the first fuel to a position downstream of the nozzle.

* * * * *